Patented May 20, 1952

2,597,696

UNITED STATES PATENT OFFICE 2,597,696

PREPARATION OF ETHYLENESULFONIC ACID

John A. Anthes, Springdale, and James R. Dudley, Darien, Conn., assignors to American Cyanamid Company, New York, N. Y., a corporation of Maine No Drawing. Application March 18, 1948, Serial No. 15,725

7 Claims. (Cl. 260—513)

This invention relates to a new and improved process for the preparation of ethylenesulfonic acid.

In the past ethylenesulfonic acid has been prepared by a multi-step process culminating in the pyrolysis of beta-acetoxyethanesulfonic acid. It has also been prepared by hydrolysis of 1,2-ethanedisulfonyl chloride. Neither of these processes has been entirely satisfactory.

It is an object of the present invention to provide a simple one-step process for the preparation of ethylenesulfonic acid.

Another object of the present invention is to provide a process for the preparation of ethylenesulfonic acid which is simple and commercially practicable.

The above and other objects are attained by dehydration of isethionic acid.

The invention will be described in greater detail in conjunction with the following specific examples in which the proportions are given in parts by weight. It should be understood that the invention is in no sense limited to the details of the examples which are merely illustrative.

EXAMPLE 1

20 parts of sodium isethionate (0.14 mol.)
50 parts of pyrophosphoric acid (0.28 mol.)

The sodium isethionate and the pyrophosphoric acid are mixed together and heated over oil in a vacuum distillation apparatus. Collection of distillate is started at 90° C. at 0.7 mm., most of the distillate coming off at 107° C. at 0.5 mm. The distillation is stopped when the head temperature begins to fall. The pot temperature is about 220°–230° C.

9 parts of the amber-colored distillate are redistilled at 93° C. at 0.07 mm., and 7.5 parts of a nearly colorless product are obtained. This represents an overall yield of 51%. The index of refraction of the ethylenesulfonic acid obtained is 1.4505 at 25° C. and its neutral equivalent, 112. The theoretical neutral equivalent for ethylenesulfonic acid is 108.

Upon exposure for 24 hours to light from a quartz mercury lamp, the ethylenesulfonic acid product polymerizes to a brown water-soluble polymer which becomes rubbery after 66 hours but is still water-soluble.

EXAMPLE 2

296 parts of sodium isethionate (2 mols.)
204 parts of 96% sulfuric acid (2 mols.)
200 parts of pyrophosphoric acid
100 parts of phosphorus pentoxide The above ingredients were mixed together in a suitable vessel equipped with means for agitation, temperature indicating means, and a distillation head with condenser and receiver arranged for vacuum distillation. The vessel is jacketed and heated electrically. Collection of distillate is started at 25° C. at 3 mm. and distillate continued about 2 hours later when the head temperature drops from 142° C. to 139° C. at 1.6 mm. Throughout the heating period, the pot temperature increases from 175° C. to 233° C. and the jacket temperature, from 232° C. to 264° C. 175 parts of crude distillate are obtained. This is redistilled at 0.5 mm., and 142 parts of a product boiling at 100°–105° C. at 0.5 mm. are obtained. This represents a yield of 66% of the theoretical.

EXAMPLE 3

Part A 74 parts of sodium isethionate (0.5 mol.)
51 parts of 96% sulfuric acid (0.5 mol.)
259 parts of methanol as an 80% aqueous solution The sodium isethionate is suspended in the methanol solution, and the sulfuric acid is carefully added. Precipitated sodium bisulfate is filtered off, and the remaining solution of isethionic acid is concentrated to 72.3% by heating to 130° C.

Part B 95 parts of 72.3% solution of isethionic acid (0.5 mol.)
142 parts of phosphorus pentoxide (1 mol.)

The phosphorus pentoxide is added to the isethionic acid with sufficient cooling so that the temperature does not rise above 150° C. The resulting solution is heated by means of an oil bath at 250° C. in a vacuum distillation apparatus at 0.8 mm. pressure. Distillation is stopped when the pot temperature reaches 238° C. (bath temperature 254° C.). 42 parts of the crude distillate, which is a brownish color, are redistilled at 0.1 mm. pressure. The main fraction which comes off at 96°–100° C. is again redistilled, and 22 parts of a product boiling at 103° C. at 0.4 mm. are obtained.

Upon analysis the final product is found to have the following composition:

| | Percent C | Percent H | Percent S |
|---|---|---|---|
| Calculated for $C_2H_4SO_3$ | 22.2 | 3.73 | 29.7 |
| Found | 22.59 | 3.95 | 30.11 |
| | 22.61 | 3.88 | 29.83 |

The sodium isethionate used as a starting material in the preceding examples may be prepared by reaction of sodium bisulfite with ethylene oxide according to the equation

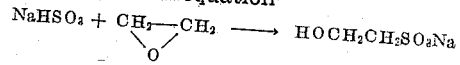

Treatment of the sodium isethionate with an acid such as sulfuric acid in accordance with Part A of Example 3 produces free isethionic acid.

Ethylenesulfonic acid is prepared according to the process of the present invention by dehydration of isethionic acid. When isethionic acid itself is used as the starting material, it may act as its own dehydrating agent and addition of another acid is not necessary for dehydration. However, the yield of ethylenesulfonic acid in such a case is not as good as when additional acid catalyst is added.

If desired, an alkali metal salt of isethionic acid, i. e., sodium isethionate, potassium isethionate, etc., may be used as the starting material in the preparation of ethylenesulfonic acid according to the process of the present invention. In such a case sufficient acidic dehydrating agent must be supplied to substantially convert the isethionate to isethionic acid which becomes dehydrated in the production of the ethylenesulfonic acid. For maximum yield of the desired product, therefore, a minimum of a 1:1 molar ratio of isethionate to acidic dehydrating agent should pertain and somewhat higher ratios, i. e., up to about 1:3, are preferred. Practical considerations dictate the upper limit on the quantity of acidic dehydrating agent to be used; the present invention is not concerned therewith nor limited thereto.

Any acidic dehydrating agent may be used in the process of the present invention. Examples of such agents include sulfuric acid, pyrophosphoric acid, phosphorus pentoxide, metaphosphoric acid, orthophosphoric acid, and the like.

The process of the present invention is accomplished by heating isethionic acid or an alkali metal salt thereof at a pressure below 3 mm. of Hg and at a pot temperature of 200°–250° C. Again only practical considerations dictate a lower limit to the pressure; it is only imperative that it be below 3 mm. of Hg. It is essential to the process of the present invention that the product be distilled off as it is formed throughout the reaction.

Ethylenesulfonic acid is useful in the preparation of polymers and particularly, in the preparation of cation exchange resins as described in the copending application of James R. Dudley, Serial No. 15,726, filed March 18, 1948, and now U. S. Patent No. 2,527,300, issued October 24, 1950.

We claim:

1. A process which comprises heating isethionic acid at a temperature of from 200° to 250° C. and at a pressure below 3 mm. of Hg, and distilling off the ethylenesulfonic acid obtained as it is formed.

2. A process according to claim 1 in which the isethionic acid is heated in the presence of an acidic dehydrating agent.

3. A process according to claim 1 in which the isethionic acid is heated in the presence of phosphorus pentoxide.

4. A process according to claim 1 in which the isethionic acid is prepared in situ by heating an alkali metal isethionate in the presence of an acidic dehydrating agent at a temperature from 200° to 250° C. and at a pressure below 3 mm. of Hg.

5. A process according to claim 1 in which the isethionic acid is prepared in situ by heating an alkali metal isethionate at a temperature of from 200° to 250° C. and at a pressure below 3 mm. of Hg in the presence of sufficient acidic dehydrating agents to effect substantially quantitative conversion of said alkali metal isethionate to isethionic acid.

6. A process according to claim 1 in which the isethionic acid is prepared in situ by heating an alkali metal salt of isethionic acid at a temperature of from 200 to 250° C. and at a pressure below 3 mm. of Hg in the presence of sufficient pyrophosphoric acid to effect substantially quantitative conversion of acid salt to isethionic acid.

7. A process according to claim 1 in which the isethionic acid is prepared in situ by heating sodium isethionate at a temperature of from 200° to 250° C. and at a pressure below 3 mm. of Hg in the presence of sufficient acidic dehydration agent to effect substantially quantitative conversion of said sodium isethionate to isethionic acid.

JOHN A. ANTHES.
JAMES R. DUDLEY.

REFERENCES CITED

The following references are of record in the file of this patent:

UNITED STATES PATENTS

| Number | Name | Date |
| --- | --- | --- |
| 2,243,331 | De Simo | May 27, 1941 |

FOREIGN PATENTS

| Number | Country | Date |
| --- | --- | --- |
| 406,788 | Great Britain | of 1934 |

OTHER REFERENCES

Murray: J. Am. Chem. Soc., vol. 62, pp. 1230–1234, May 1940.

Matignon et al.: Bull. Soc. Chim. France, vol. 2, 5th Ser., part 2, p. 1170 (1935).

"Organic Chemistry of Sulfur" by Suter, 1944 edition, p. 133.